(12) United States Patent
Almarzooq et al.

(10) Patent No.: US 11,579,333 B2
(45) Date of Patent: Feb. 14, 2023

(54) METHODS AND SYSTEMS FOR DETERMINING RESERVOIR PROPERTIES FROM MOTOR DATA WHILE CORING

(71) Applicant: Saudi Arabian Oil Company, Dhahran (SA)

(72) Inventors: Anas Mohammedali Almarzooq, Dhahran (SA); Shouxiang Mark Ma, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 352 days.

(21) Appl. No.: 16/812,910

(22) Filed: Mar. 9, 2020

(65) Prior Publication Data

US 2021/0278563 A1    Sep. 9, 2021

(51) Int. Cl.
*G01V 99/00* (2009.01)
*E21B 49/06* (2006.01)

(52) U.S. Cl.
CPC ............ *G01V 99/005* (2013.01); *E21B 49/06* (2013.01); *E21B 2200/20* (2020.05)

(58) Field of Classification Search
CPC .... G01V 99/005; E21B 49/06; E21B 2200/20
USPC .............................................................. 702/9
See application file for complete search history.

(56) References Cited

U.S. PATENT DOCUMENTS

| | | | | |
|---|---|---|---|---|
| 4,317,490 A | * | 3/1982 | Milberger | E21B 25/18 175/20 |
| 4,848,487 A | * | 7/1989 | Anderson | E21B 25/08 175/58 |
| 4,969,130 A | | 11/1990 | Wason et al. | |
| 4,982,604 A | * | 1/1991 | Davis | G01N 33/241 378/62 |
| 5,012,674 A | * | 5/1991 | Millheim | G01N 33/241 324/201 |
| 5,109,697 A | * | 5/1992 | Millheim | G01V 11/00 175/50 |
| 5,310,013 A | * | 5/1994 | Kishino | E21B 25/16 175/58 |
| 5,411,106 A | * | 5/1995 | Maissa | E21B 49/06 175/254 |

(Continued)

FOREIGN PATENT DOCUMENTS

| | | |
|---|---|---|
| CN | 105927211 A | 9/2016 |
| WO | 2013049158 A2 | 4/2013 |

OTHER PUBLICATIONS

Torlov et al. (Data Driven Assessment of Rotary Sidewall Coring Performance, 2017, Society of Petroleum Engineers, pp. 1-22) (Year: 2017).*

(Continued)

*Primary Examiner* — Iftekhar A Khan
(74) *Attorney, Agent, or Firm* — Bracewell LLP; Constance G. Rhebergen; Keith R. Derrington

(57) ABSTRACT

Embodiments provide techniques for using data from a select set of wells to develop correlations between surface-measured properties, downhole coring parameters, and properties typically determined from subsurface measurements (e.g., from logging tool responses, core analysis, or other subsurface measurements). When new wells are drilled, the surface data acquired while drilling and coring parameters used downhole may be used as an input to these correlations in order to predict properties associated with subsurface measurements.

18 Claims, 7 Drawing Sheets

(56) References Cited

U.S. PATENT DOCUMENTS

| | | | | |
|---|---|---|---|---|
| 5,617,927 A * | 4/1997 | Maissa | E21B 49/06 | 175/78 |
| 5,670,711 A * | 9/1997 | Detournay | G01N 3/58 | 73/866 |
| 5,835,883 A * | 11/1998 | Neff | G01V 11/00 | 702/7 |
| 6,006,844 A * | 12/1999 | Van Puymbroeck | E21B 47/26 | 73/152.43 |
| 6,371,221 B1 * | 4/2002 | Harrigan | E21B 49/06 | 175/81 |
| 7,802,495 B2 * | 9/2010 | Oxford | C22C 29/08 | 175/425 |
| 8,301,428 B2 | 10/2012 | Lukyanov et al. | | |
| 9,097,821 B2 | 8/2015 | Skalinski et al. | | |
| 9,482,088 B2 | 11/2016 | Wlodarczyk | | |
| 9,624,768 B2 * | 4/2017 | Yang | E21B 49/00 | |
| 9,982,534 B2 | 5/2018 | Moake | | |
| 2002/0157867 A1 * | 10/2002 | Moore | E21B 49/06 | 175/58 |
| 2003/0051916 A1 * | 3/2003 | Streich | E21B 4/18 | 175/57 |
| 2005/0284629 A1 * | 12/2005 | Reid | E21B 49/10 | 166/264 |
| 2006/0081398 A1 * | 4/2006 | Arian | E21B 49/06 | 175/58 |
| 2009/0164128 A1 * | 6/2009 | Tchakarov | E21B 49/10 | 702/11 |
| 2010/0051347 A1 * | 3/2010 | Tchakarov | E21B 49/06 | 175/50 |
| 2011/0094801 A1 * | 4/2011 | Buchanan | E21B 4/04 | 175/249 |
| 2011/0174543 A1 * | 7/2011 | Walkingshaw | E21B 49/06 | 175/58 |
| 2012/0318579 A1 * | 12/2012 | Yang | E21B 44/005 | 175/44 |
| 2013/0008719 A1 * | 1/2013 | Moon | E21B 49/02 | 175/58 |
| 2013/0056276 A1 * | 3/2013 | Rousseau | E21B 25/00 | 175/58 |
| 2013/0068531 A1 * | 3/2013 | Joulin | E21B 4/02 | 175/78 |
| 2013/0081879 A1 * | 4/2013 | Ward | E21B 10/02 | 175/94 |
| 2014/0025301 A1 * | 1/2014 | Storm, Jr. | G01V 11/00 | 702/6 |
| 2014/0102794 A1 * | 4/2014 | Tevis | E21B 47/024 | 33/304 |
| 2015/0021096 A1 * | 1/2015 | Wesemeier | E21B 25/08 | 175/57 |
| 2015/0021097 A1 * | 1/2015 | Wesemeier | E21B 25/00 | 175/59 |
| 2015/0322722 A1 * | 11/2015 | Uhlenberg | E21B 10/02 | 175/403 |
| 2016/0025895 A1 * | 1/2016 | Ziauddin | E21B 41/00 | 702/11 |
| 2016/0053564 A1 * | 2/2016 | Haley | E21B 4/006 | 175/50 |
| 2016/0258223 A1 * | 9/2016 | Uhlenberg | E21B 10/48 | |
| 2016/0273292 A1 * | 9/2016 | Morgan | E21B 25/10 | |
| 2017/0107813 A1 * | 4/2017 | Feng | E21B 4/16 | |
| 2017/0159429 A1 * | 6/2017 | Massey | E21B 49/06 | |
| 2017/0241260 A1 * | 8/2017 | Gonzalez Perez | E21B 49/10 | |
| 2017/0241266 A1 * | 8/2017 | Cherry | E21B 43/34 | |
| 2018/0216458 A1 * | 8/2018 | Garcia | E21B 49/10 | |
| 2018/0225868 A1 * | 8/2018 | Bize | E21B 25/00 | |
| 2018/0238774 A1 * | 8/2018 | Amendt | G01N 3/00 | |
| 2019/0057168 A1 * | 2/2019 | Holland | E21B 49/081 | |
| 2019/0153852 A1 * | 5/2019 | Lallemand | E21B 47/12 | |
| 2019/0234204 A1 * | 8/2019 | Moronkeji | E21B 47/14 | |
| 2019/0257197 A1 * | 8/2019 | Palmer | E21B 49/005 | |
| 2019/0330948 A1 * | 10/2019 | Kordex | E21B 25/00 | |
| 2019/0368994 A1 * | 12/2019 | Al Readean | G01N 33/241 | |
| 2020/0325758 A1 * | 10/2020 | Hull | E21C 41/16 | |
| 2021/0255353 A1 * | 8/2021 | Mezghani | E21B 25/005 | |
| 2021/0270130 A1 * | 9/2021 | Lu | G01V 1/46 | |
| 2021/0278563 A1 * | 9/2021 | Almarzooq | E21B 49/003 | |

OTHER PUBLICATIONS

Ardo BU (Correlating Core Analysis and Well Logging: The Stezyca Oil and Gas Field, 2016, Oil and Gas Research, pp. 1-11) (Year: 2016).*

Prasad et. al. ("Rotary Sidewall Coring and its Use in Real-Time Strength Estimation", ARMA, 2016, pp. 1-5). (Year: 2016).*

International Search Report and Written Opinion for International Application No. PCT/US2021/021552 report dated Jun. 21, 2021; pp. 1-16.

Prasad, U. et al.; "Rotary Sidewall Coring and its Use in Real-Time Strength Estimation" ARMA 16-311, 50th US Rock Mechanics / Goemechanics Symposium, Houston, TX Jun. 26-29, 2016; pp. 1-5.

Fairhurst, C.; "The Scratch Test—An Innovative and Inexpensive Method to Determine the Compressive Strength and Mohr-Coulomb Failure Envelope for Sedimentary Rock" 8th Asian Rock Mechanics Symposium, Oct. 14-16, Sapporo, Japan; pp. 438-446.

Germay, C. et al.; "The Continuous-Scratch Profile: A High-Resolution Strength Log for Geomechanical and Petrophysical Characterization of Rocks" SPE 174086, SPE Reservoir Evaluation & Engineering, Aug. 2015; pp. 432-440.

Suarez-Rivera, Roberto et al.; "Continuous Scratch Testing on Core Allows Effective Calibration of Log-Derived Mechanical Properties for Use in Sanding Prediction Evaluation" SPE/ISRM 78157, SPE/ISRM Rock Mech. Conf., Irving, TX Oct. 20-23, 2002; pp. 1-7.

* cited by examiner

METHODS AND SYSTEMS FOR DETERMINING RESERVOIR PROPERTIES FROM MOTOR DATA WHILE CORING

TECHNICAL FIELD

Embodiments generally relate to methods and systems for use in the oil and gas industry. More specifically, the disclosure relates to methods and system for determining reservoir properties from data acquired from a motor while coring.

BACKGROUND

Modern petroleum drilling and production operations demand a great quantity of information relating to parameters and conditions downhole. Such information typically includes characteristics of the earth formations traversed by the wellbore, in addition to data relating to the size and configuration of the borehole itself. Oil well logging has been known in the industry for many years as a technique for providing information to a formation evaluation professional or driller regarding the particular earth formation being drilled. The most sought-after information relates to the location and accessibility of hydrocarbon liquids and gases. In other words, logs may be used to make operational decisions about the well, to correlate formation depths with surrounding wells, and to make interpretations about the quantity and quality of hydrocarbons present.

The collection of information relating to conditions downhole, which commonly is referred to as "logging," can be performed by several methods. These methods include measurement while drilling (MWD) and logging while drilling (LWD), in which a logging tool is carried on a drill string during the drilling process. The methods also include wireline logging. Generally, during the well-drilling process, or shortly thereafter, instruments are passed through the wellbore to collect information about the formations through which the wellbore passes.

In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides electrical connections between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole as the sonde is pulled uphole.

A chart or plot of an earth parameter or of a logging tool signal versus the position or depth in the borehole is called a "log." The depth may be the distance from the surface of the earth to the location of the tool in the borehole or may be true depth, which may be the same only for a perfectly vertical straight borehole. The log of the tool signal or raw data often does not provide a clear representation of the earth parameter which the formation evaluation professional or driller needs to know. The tool signal must usually be processed to produce a log which more clearly represents a desired parameter. The log is normally first created in digital form by a computer and stored in computer memory, on tape, disk, etc. and may be displayed on a computer screen or printed in hard copy form.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors.

Porosity, permeability, and fluid content have proven to be particularly useful for determining the location of hydrocarbon gases and fluids. Porosity is the proportion of fluid-filled space found within the rock. It is this space that contains the oil and gas. Permeability is the ability of fluids to flow through the rock. The higher the porosity, the higher the possible oil and gas content of a rock reservoir. The higher the permeability, the easier for the oil and gas to flow toward the wellbore. Logging tools provide measurements that allow for the mathematical interpretation of these quantities.

Beyond just the porosity and permeability, various logging measurements allow the interpretation of what kinds of fluids are in the pores (e.g., oil, gas, brine). In addition, the logging measurements may be used to determine mechanical properties of the formations. These mechanical properties determine what kind of enhanced recovery methods may be used (e.g., tertiary recovery) and what damage to the formation (such as erosion) is to be expected during oil and gas production.

There are risks involved with utilizing logging tools downhole, particularly in deviated or horizontal wells. For example, logging tools are sometimes trapped downhole by collapsing wellbore walls. In the case of radioisotopic source tools, the trapping of a tool poses particular cause for concern. Moreover, by the time operational decisions about a well are made based on information from logging tools, the well may already be completed. Traditionally, samples from coring tools are taken to a laboratory for determining parameters such as porosity and permeability. By the time that decisions are made based on these parameters, it may be too late to make changes in the drilling of the well. Utilizing logging tools may also drive up the cost of a well.

SUMMARY

Embodiments of the present invention generally provide techniques for using data acquired wholly or substantially from data which may be collected from measurements made at the coring surface of a wellbore to predict select reservoir properties without requiring wellbore logs.

Accordingly, one embodiment is a method to utilize information provided by motor data while coring (conventional coring as well as sidewall coring) to determine reservoir properties including geological, petrophysical, and mechanical properties of subsurface formations. One embodiment is a method for determining a characteristic of a subsurface formation. The method includes receiving, by a processor, coring data from a coring operation performed on the subsurface formation, the coring data including a plurality of coring parameters. The method further includes receiving, by the processor, values for one or more properties of the subsurface formation measured as a result of the coring operation, and repeating the first two steps for a plurality of coring operations. The method further includes generating, by the processor, a computer model based on the coring data and the one or more properties obtained from the plurality of coring operations. The method further includes deriving, by the processor, a relationship between the coring data and the one or more properties of the subsurface formation. For example, the reservoir property can be expressed as a function of the coring motor data, which function can be determined based on the relationship. The method may also include receiving, by the processor, new coring data from a new coring operation performed on the subsurface formation, the new coring data including a plurality of new coring parameters. The method may further include determining, by the processor, one or more characteristics of the subsurface formation based on the new coring data and the relationship derived between the coring data and the one or more properties of the sub surface formation.

Another embodiment of the present invention provides a system for determining a characteristic of a subsurface formation. The system includes a coring motor, and a computer comprising non-transitory computer readable medium including program instructions that when executed by a processor cause the processor to perform the operations of receiving coring data from a coring operation performed on the subsurface formation, the coring data including a plurality of coring parameters, receiving values for one or more properties of the subsurface formation measured as a result of the coring operation, and repeating the first two steps for a plurality of coring operations. The program instructions further include generating a computer model based on the coring data and the one or more properties obtained from the plurality of coring operations, and deriving a relationship between the coring data and the one or more properties of the subsurface formation. The program instructions may also include receiving new coring data from a new coring operation performed on the subsurface formation, the new coring data including a plurality of new coring parameters, and determining one or more characteristics of the subsurface formation based on the new coring data and the relationship derived between the coring data and the one or more properties of the subsurface formation.

BRIEF DESCRIPTION OF THE DRAWINGS

All aspects and features of certain example embodiments of the present disclosure will be more apparent from the following description taken in conjunction with the accompanying drawings, in which.

DETAILED DESCRIPTION

The particulars shown here are by way of example and for purposes of illustrative discussion of the examples of the subject disclosure only, and are presented in the cause of providing what is believed to be the most useful and readily understood description of the principles and conceptual aspects of the subject disclosure. In this regard, no attempt is made to show more detail than is necessary, the description taken with the drawings making apparent to those skilled in the art how the several forms of the subject disclosure may be embodied in practice. Furthermore, like reference numbers and designations in the various drawings indicate like elements.

Figure 1:
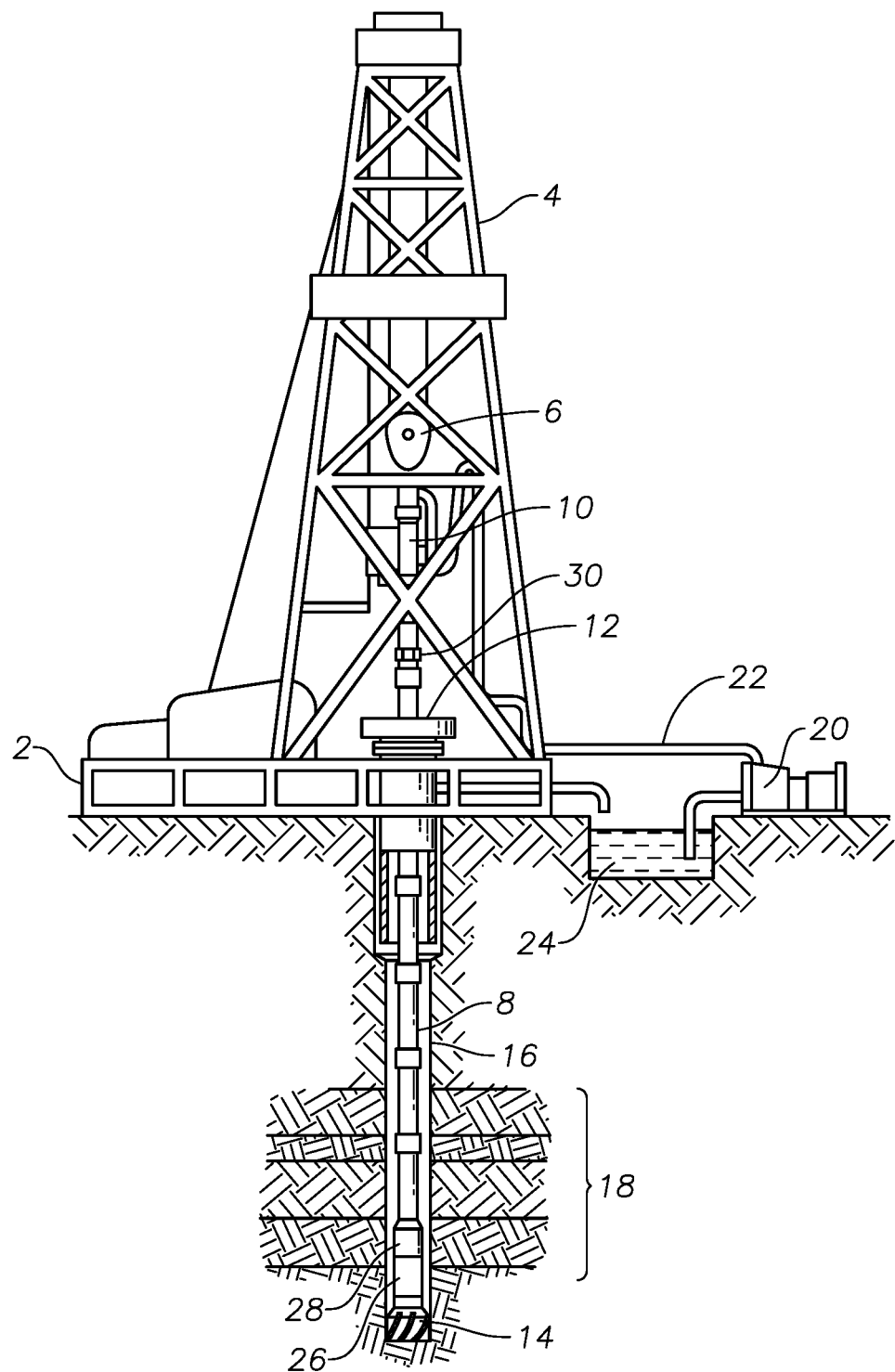
FIG. 1 is an illustrative view of a LWD (logging while drilling) environment, according to the teachings of prior art.

FIG. 1 shows an illustrative environment for drilling a well. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As the bit 14 rotates, it creates a wellbore 16 that passes through various formations 18. A pump 20 circulates drilling fluid through a feed pipe 22 to kelly 10, through the interior of drill string 8, through orifices in drill bit 14, back to the surface via the annulus around drill string 8, and into a retention pit 24. The drilling fluid transports cuttings from the wellbore into the pit 24.

One or more LWD instruments are integrated into a logging tool 26 located near the bit 14. As the bit extends the wellbore through the formations, logging tool 26 collects measurements relating to various formation properties as well as the bit position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

Figure 2:
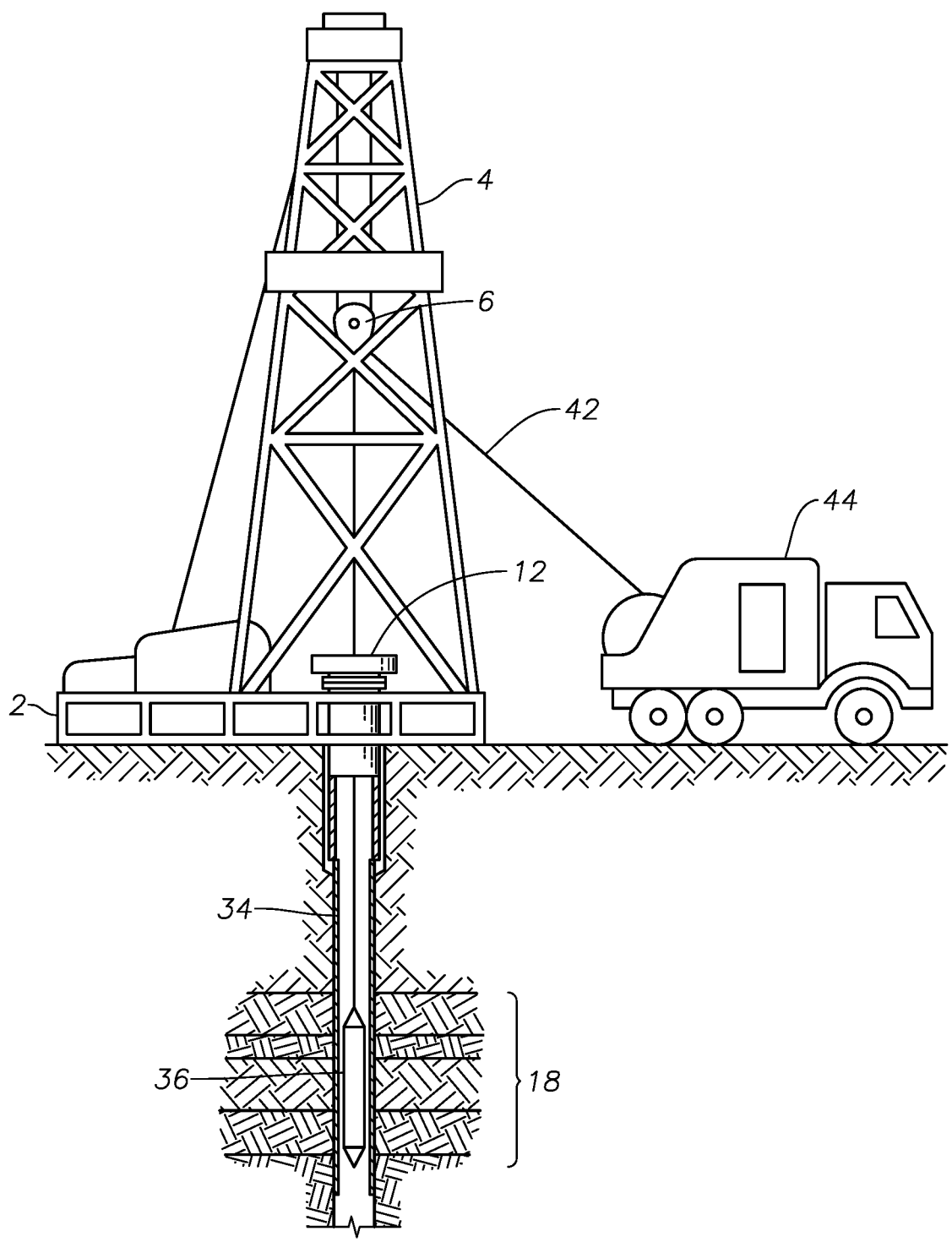
FIG. 2 is an illustrative view of a wireline logging environment, according to the teachings of prior art.

Once a well has been drilled, the wellbore 16 may be lined with casing 34 as shown in FIG. 2 to preserve the integrity of the hole and to prevent fluid loss into porous formations along the borehole path. Typically, the casing is permanently cemented into place to maximize the borehole's longevity and to prevent unwanted fluid communication between formations. Subsequent logging operations may be conducted using a wireline logging tool 36, i.e., a sensing instrument sonde suspended by a cable 42 having conductors for transporting power to the tool and telemetry from the tool to the surface. A logging facility 44 collects measurements from the logging tool 36, and typically includes computing facilities for processing and storing the measurements gathered by the logging tool.

The logging information is intended to characterize formations 18 so as to locate reservoirs of oil, gas, or other underground fluids, and so as to provide data for use in field correlation studies and to assist in seismic data interpretation. Whenever possible, logging is performed in uncased ("open hole") conditions because the logging tool can achieve closer contact with the formation and because some of the desired open hole measurements are adversely affected by the casing and/or cement in a cased borehole. However, the open hole logging environment is somewhat more hostile than the cased hole environment, since the wellbore has less integrity. For example, logging tools maybe trapped downhole by collapsing wellbore walls, as mentioned above. In the case of radioisotopic source tools, the trapping of a tool poses particular cause for concern.

Moreover, by the time operational decisions about a well are made based on information from logging tools, the well may already be completed. Traditionally, samples from coring tools are taken to a laboratory for determining parameters such as porosity and permeability. By the time that decisions are made based on these parameters, it may be too late to make changes in the drilling of the well. In view of the risk, time, and costs involved with running and utilizing logging tools downhole, it is desirable to reduce the use of logging tools. However, it is particularly desirable to have the information provided by downhole tools in order to make operational decisions.

For the purposes of this invention, "the surface" is meant to denote at least areas accessible without entering the wellbore. Examples of the surface may include the surface of the earth, the surface of the sea floor, or the surface of the ocean. "Surface data" is taken to mean data which may be acquired from measurements made substantially from the surface. This data may be indicative of subsurface properties or conditions. "Logs", "logging tools", "logging tool responses," and related terms are meant to denote subsurface measurements of formation or fluid properties, independent of the method of conveyance (e.g., wireline, slickline, drillpipe, coiled tubing, etc.) or the time at which the measurement is made in the course of drilling and completing the well.

Figure 3A:
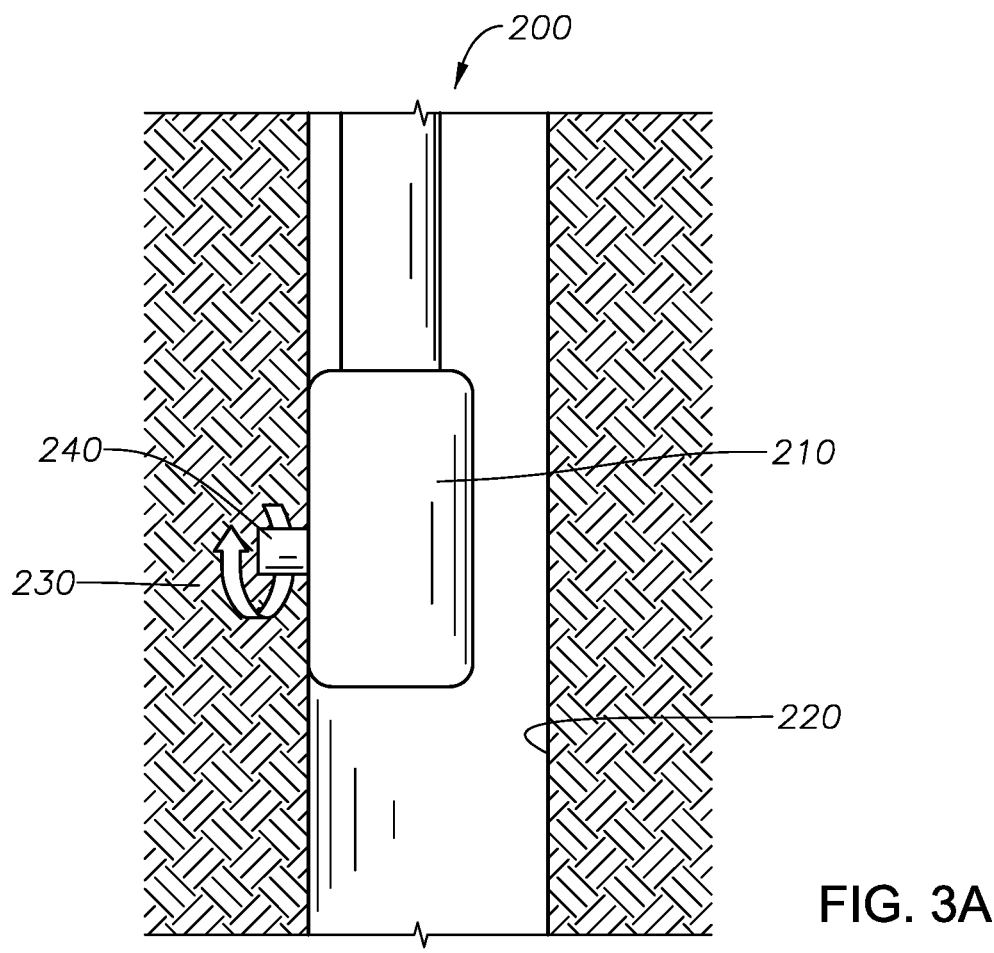
FIGS. 3A and 3B illustrate a side wall coring operation performed in accordance with one embodiment of the disclosure.
Figure 3B:
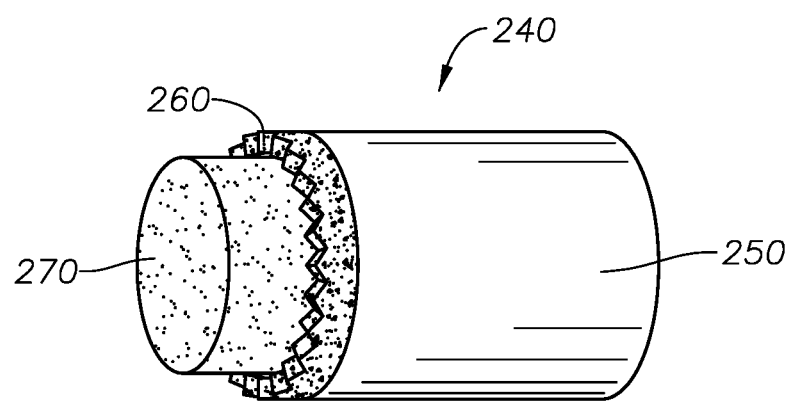

Turning now to FIG. 3A, illustrated is a sidewall coring system 200 for obtaining a core sample from a subsurface formation 230, according to one or more example embodiments. In sidewall coring, the coring motor 210 rotates a horizontal coring bit 240 against the wellbore 220 to drill and cut core samples often referred to as a "side-wall core." During this process, the motor 210 applies both rotational force and axial force to allow the horizontal coring bit 240 to drill through the formation 230. FIG. 3B illustrates an enlarged view of the horizontal coring bit 240, which includes a rotating bit 250 that penetrates horizontally into the formation 230. The rotating bit 250 has a cutting surface, including for example polycrystalline diamonds, which cuts into the formation 230 to obtain a core sample 270.

According to one embodiment of the present invention, by recording different motor measurements at specific conditions where no fluid circulation occurs, the rock strength can be determined by providing the core acquisition performed at certain conditions. For example, the coring process occurs at a relatively static condition where no mud circulation occurs, no pumping is applied, there is no mud circulation friction, and the mud weight is static with no drill-cuttings, and cuttings in the wellbore have already been circulated and cleaned before attempting the side-wall coring (SWC).

In addition to the above conditions, the method may be focused on a specification rock formation, for example, with a mix of mineralogy including organic matter, clay, and clastic. In order to avoid having the side wall coring bit being worn, the first three cores are used in the evaluation. The recorded motor data required to apply forces and acquire SWC along with wellbore fluid properties and wellbore conditions are used to establish correlation against core and log derived mechanical property of the formation. Results showed good correlation that can predict the rock mechanical property once the required condition is established across the same formation where the tests are conducted. For example, the rock formation may be characterized by having high total organic carbon (TOC) and showing homogenous petrophysical properties between wells in same area.

Figure 4:
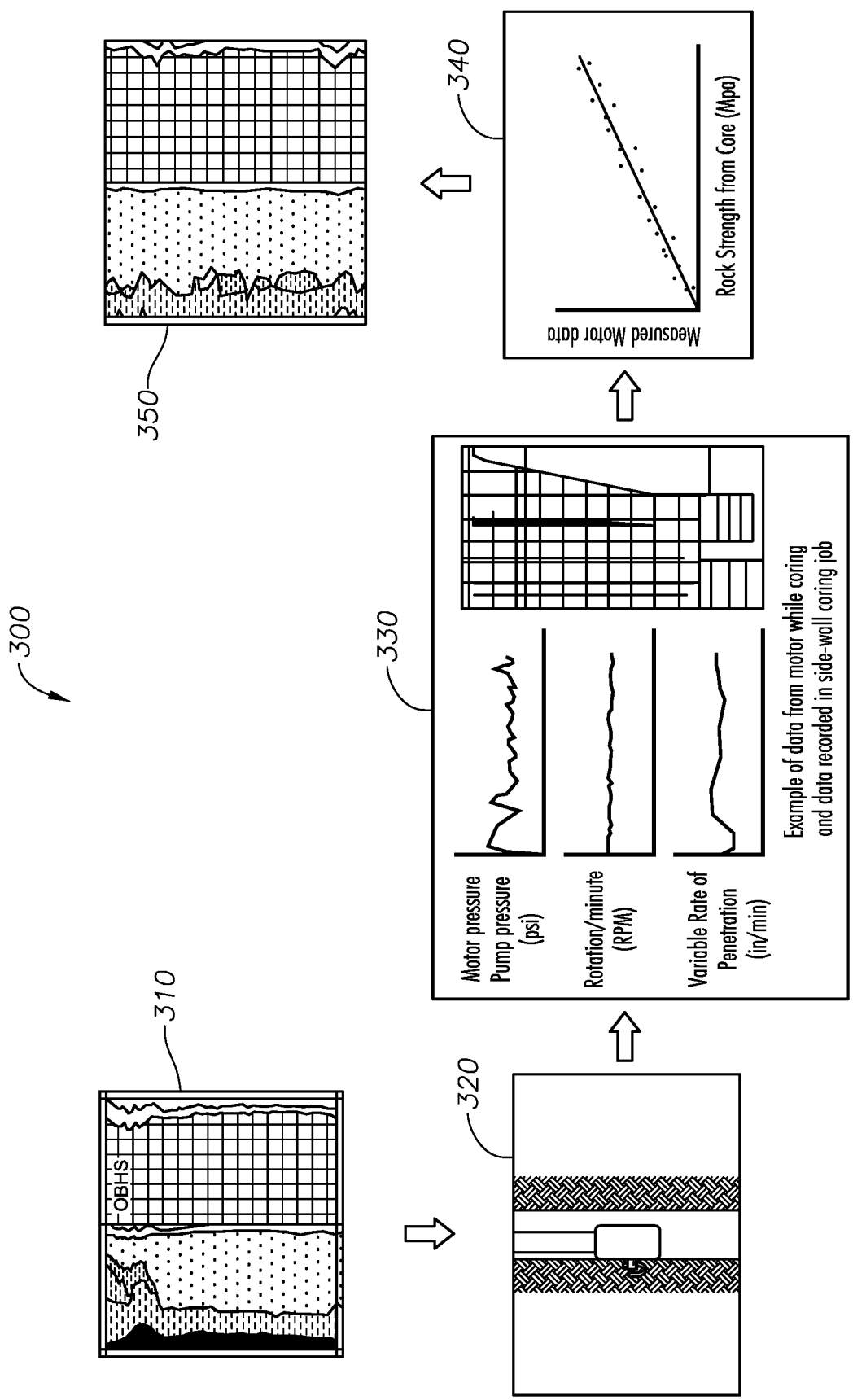
FIG. 4 illustrates example steps in a method for determining a characteristic of a subsurface formation, according to one embodiment of the disclosure.

FIG. 4 illustrates example steps in a method 300 for determining a characteristic of a subsurface formation, according to one embodiment. At step 310, the various measured properties of the subsurface formation are recorded. At step 320, the coring operation is performed. At step 330, a processor receives data from the coring motor, which may include variables such as downhole coring position, timing, rate of penetration (ROP), torque, rotation/revolution per minute (RPM), sound caused by cutting the rock formation in terms of amplitude and frequency, coring pressure applied, along with hydraulic pressure. At step 340, a correlation is established between the one or more coring motor data and the one or more properties of the subsurface formation. Once the correlation is established, at step 350, the SWC motor data is applied to the formation during coring jobs in the same formation with similar mineralogy and wellbore conditions, and one or more characteristics of the subsurface formation are determined based on the motor data and the correlation established. The method includes utilizing recorded motor data and correlating it to lab measured properties to establish a localized relationship. Once this relationship is established the motor data may be used directly to evaluate rock properties at a given condition within the same formation.

In step 340, the coring parameters 330 may be correlated with core measurements to build a correlation model. In step 350, the correlation model may be used to predict reservoir properties from coring parameters. The predicted reservoir properties are then compared with measurements to validate the correlation model. Validated correlation models can be used for determining one or more reservoir properties using the coring motor data including for example the coring parameters.

Figure 5:
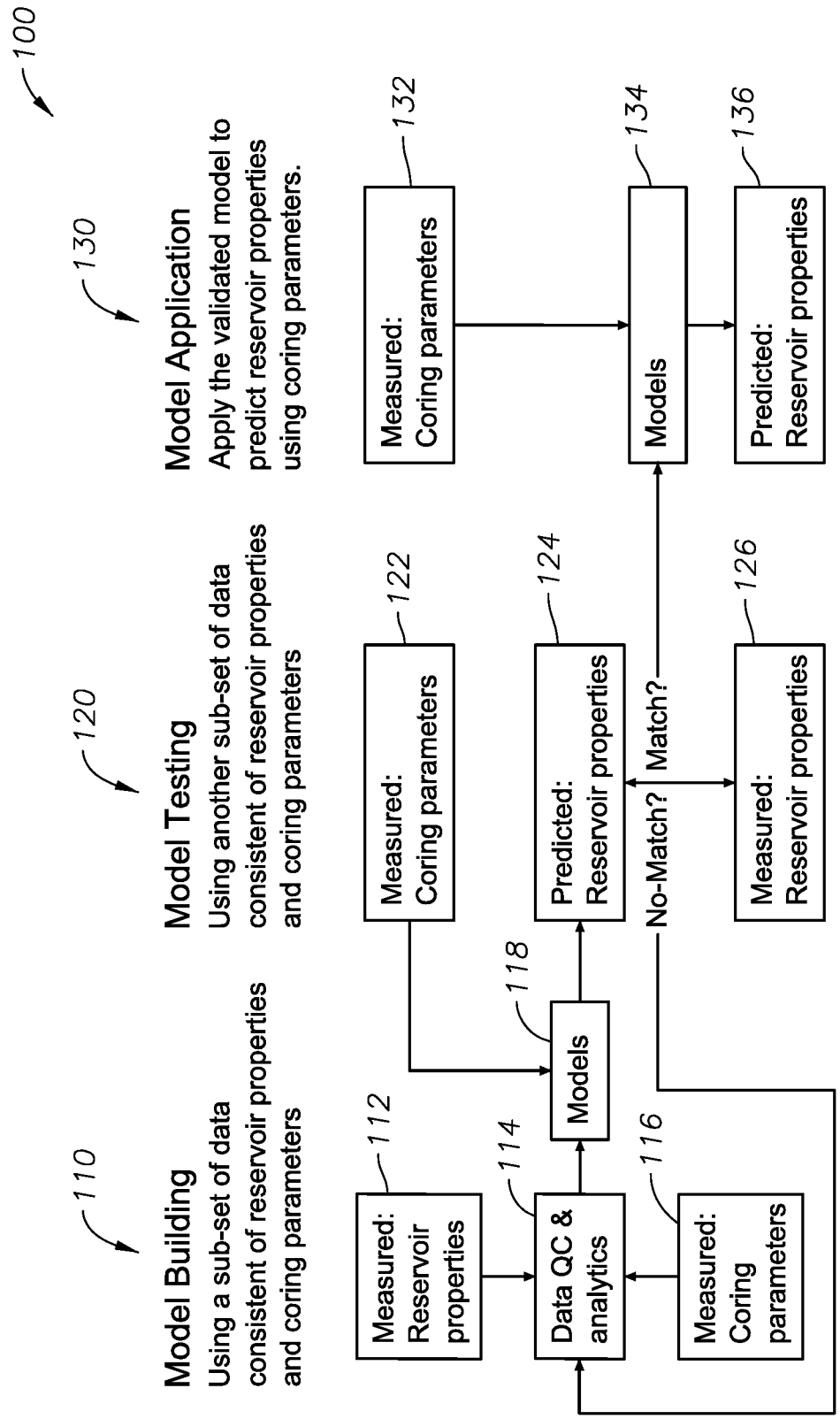
FIG. 5 illustrates example steps in a method for determining a characteristic of a subsurface formation, according to one embodiment of the disclosure.

FIG. 5 illustrates example steps in a method 100 for determining a characteristic of a subsurface formation, according to one embodiment of the disclosure. Step 110 involves model building, which includes using a sub-set of data comprising measured reservoir properties and measure coring parameters. For example, step 110 may include receiving measured reservoir properties at step 112, receiving measured coring parameters at step 116, performing data quality check and data analytics on the received data, at step 114, and building a model correlating the measured reservoir properties and measured coring parameters, at step 118. The method 100 may further include the step of model testing 120, which may involve using another sub-set of data comprising reservoir properties and coring parameters. For example, step 120 may include receiving measuring coring parameters in step 122, applying the measured coring parameters in the model developed in step 110, and predicting one or more reservoir properties, at step 124. Step 120 may further include comparing the predicted values to the measured reservoir properties, in step 126. If there is a match between the predicted values and the measured reservoir properties, then the model is validated in step 130. For example, step 130 includes model application, which involves applying the validated model to predict one or more reservoir properties using the coring parameters as inputs to the model validated in step 120. If the model prediction is un-satisfactory, then the model needs to be fine-tuned by further data quality control and data analytics (such as by optimizing weight factors in modeling). Multiple iterations may be needed until a robust model is obtained. Step 130 involves receiving measured coring parameters at step 132, applying the measured coring parameters to the robust model, in step 134, and determining one or more reservoir properties, in step 136.

Figure 6:
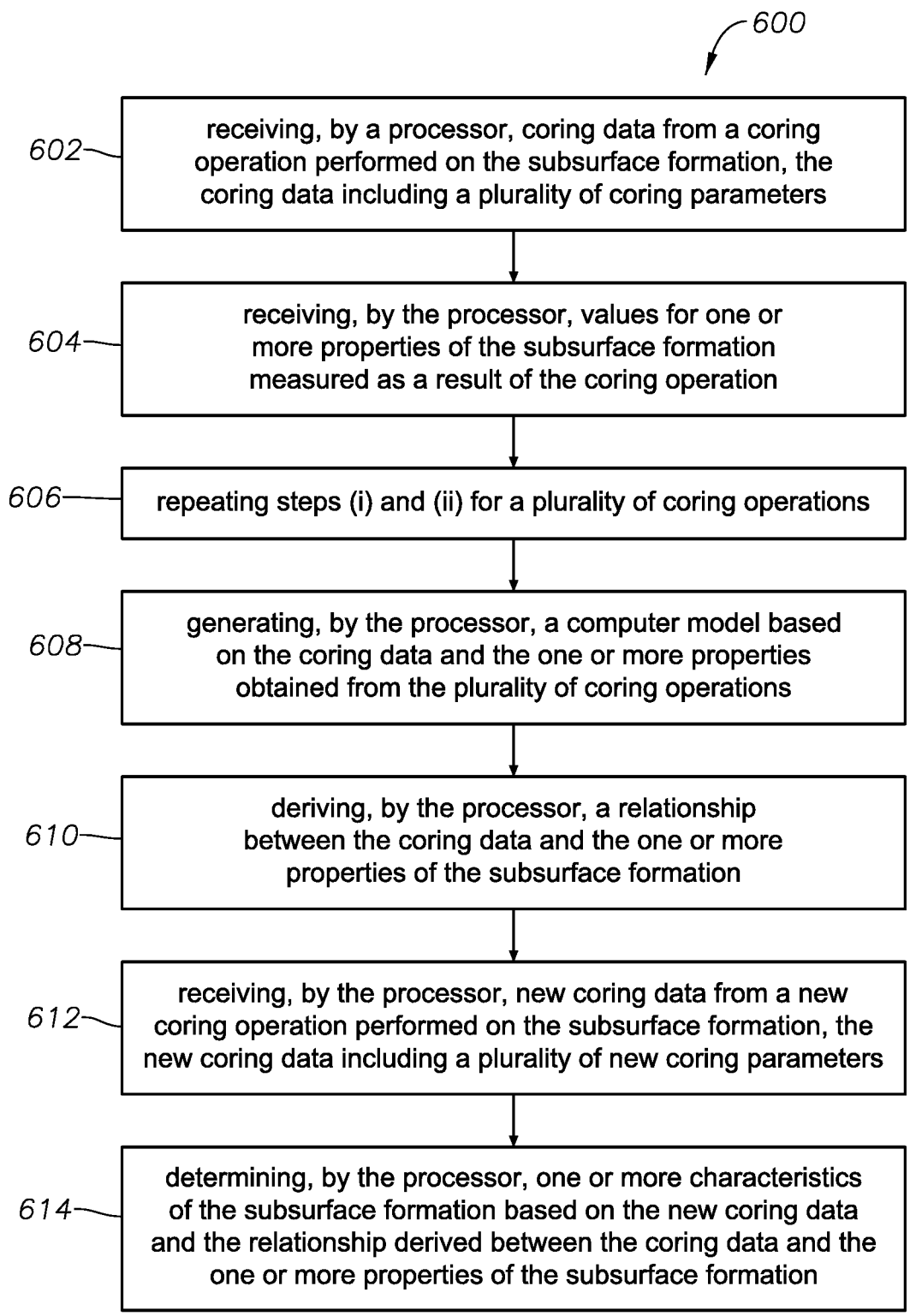
FIG. 6 illustrates example steps in a method for determining a characteristic of a subsurface formation, according to one embodiment of the disclosure.

FIG. 6 illustrates example steps in a method 600 for determining a characteristic of a subsurface formation, according to one embodiment of the disclosure. The method includes, at step 602, receiving, by a processor, coring data from a coring operation performed on the subsurface formation. The coring data may include a plurality of coring parameters, for example. The method further includes, at step 604, receiving, by the processor, values for one or more properties of the subsurface formation measured as a result of the coring operation. The method further includes, at step 606, repeating the first two steps for a plurality of coring operations. The method further includes, at step 608, generating, by the processor, a computer model based on the coring data and the one or more properties obtained from the plurality of coring operations. The method also includes, at step 610, deriving, by the processor, a relationship between the coring data and the one or more properties of the subsurface formation. For example, the reservoir property can be expressed as a function of the coring motor data, which function can be determined based on the relationship. Method 600 may further include, at step 612, receiving, by the processor, new coring data from a new coring operation performed on the subsurface formation, the new coring data including a plurality of new coring parameters. The method may further include at step 614, determining, by the processor, one or more characteristics of the subsurface formation based on the new coring data and the relationship derived between the coring data and the one or more properties of the subsurface formation. The step of deriving a relationship between the coring data and the one or more properties of the subsurface formation may further include determining a correlation between the coring data and the one or more properties.

In one embodiment, the coring data may include data obtained from a motor used for performing the coring operation. For example, the plurality of coring parameters may include coring pressure, coring temperatures, sound caused by cutting the rock formation in terms of amplitude and frequency, revolutions per minute (RPM) of the coring operation, and rate of penetration (ROP) of the coring operation. The one or more properties of the subsurface formation may include at least one of geological, petrophysical, and mechanical properties of the subsurface formation. The geological properties may include at least one of mineralogy and cementation. The petrophysical properties may include at least one of porosity, permeability, and grain density. The mechanical properties may include at least one of Young's modulus, bulk modulus, Poisson's ratio, fracture gradient, and formation strength. It should be noted, however, that the methods disclosed in the above example embodiments may be applied to conventional coring and sidewall coring.

Figure 7:
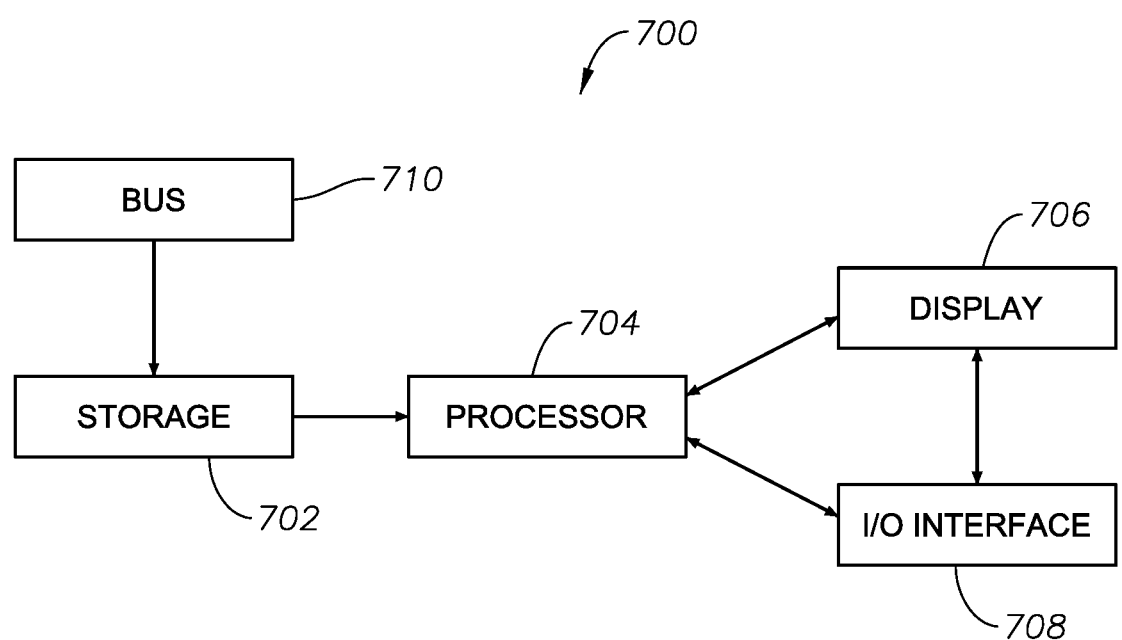
FIG. 7 is a schematic drawing of a representative computer system that may be used for carrying out the methods of FIGS. 1-6, according to one embodiment of the disclosure.

FIG. 7 is a schematic drawing of a representative computer system 700 that may be used for carrying out the methods of FIGS. 1-6, according to one embodiment of the disclosure. The system 700 includes a data storage device or memory 702. The stored data may be made available to a processor 704, such as a programmable general purpose computer. The processor 704 may include interface components such as a display 706 and an input and/or output (I/O) interface 708. The interface 708 may be used both to display data and processed data products and to allow the user to select among options for implementing aspects of the method. Data may be transferred to the system 700 via a bus 710 either directly from a data acquisition device, or from an intermediate storage or processing facility (not shown).

As will be appreciated, the individual data sources, modeling modules, and view modules may be typical software programs in accordance with usual practice. The central data management module is designed in accordance with the input and output requirements of these modules. In an embodiment, the various modules are implemented in an object oriented programming language in which properties are defined in accordance with specified classes. When one of the modules initiates a change to a particular item of data, either in response to a user input or as a result of a modeling calculation, the change is returned to the central data management module which then propagates the change to the data in the same class as the changed data, thereby ensuring that all modules are synchronized.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures.

The invention claimed is:

1. A method for determining a characteristic of a subsurface formation, the method comprising:
   (i) obtaining a core sample from the subsurface formation with a coring operation and delivering coring data from the coring operation to a processor, the coring data including a plurality of coring parameters;
   (ii) measuring values for one or more properties of the subsurface formation from the core sample and delivering the one or more properties of the subsurface formation to the processor;
   (iii) repeating steps (i) and (ii) for a plurality of coring operations;
   (iv) generating, by the processor, a computer model correlating the coring data and the one or more properties of the subsurface formation;
   (v) using the computer model to derive, by the processor, a relationship between the coring data and the one or more properties of the subsurface formation;
   (vi) receiving, by the processor, new coring data from a new coring operation performed on the subsurface formation, the new coring data received during the new coring operation and including a plurality of new coring parameters; and
   (vii) determining, by the processor, during the new coring operation one or more predicted characteristics of the subsurface formation based on the new coring data and the relationship between the coring data and the one or more properties of the subsurface formation derived in step (v); where
   the one or more predicted characteristics of the subsurface formation is selected from a group consisting of mineralogy, cementation, porosity, permeability, and grain density.

2. The method of claim 1, wherein the coring data comprises data obtained from a motor used for performing the coring operation.

3. The method of claim 1, wherein the plurality of coring parameters comprise coring pressure, coring temperatures, sound caused by cutting the rock formation in terms of amplitude and frequency, revolutions per minute (RPM) of the coring operation, and rate of penetration (ROP) of the coring operation.

4. The method of claim 1, wherein the one or more properties of the subsurface formation comprise at least one of geological, petrophysical, and mechanical properties of the subsurface formation.

5. The method of claim 4, wherein the geological properties comprise at least one of mineralogy and cementation.

6. The method of claim 4, wherein the petrophysical properties comprise at least one of porosity, permeability, and grain density.

7. The method of claim 4, wherein the mechanical properties comprise at least one of Young's modulus, bulk modulus, Poisson's ratio, fracture gradient, and formation strength.

8. The method of claim 1, the coring operation comprises at least one of conventional coring and sidewall coring.

9. The method of claim 1, wherein the step of deriving a relationship between the coring data and the one or more properties of the subsurface formation includes determining a correlation between the coring data and the one or more properties of the subsurface formation.

10. A system for determining a characteristic of a subsurface formation, the system comprising:
   a core sample obtained from the subsurface formation with a coring operation; and
   a computer comprising non-transitory computer readable medium including program instructions that when executed by a processor cause the processor to perform the operations of:
   (i) receiving coring data from the coring operation with a processor, the coring data including a plurality of coring parameters;
   (ii) receiving values for one or more properties of the subsurface formation measured from the core sample, and delivering the one or more properties of the subsurface formation to the processor;
   (iii) repeating steps (i) and (ii) for a plurality of coring operations;
   (iv) generating a computer model correlating the coring data and the one or more properties of the subsurface formation;
   (v) deriving a relationship between the coring data and the one or more properties of the subsurface formation using the computer model;
   (vi) receiving new coring data from a new coring operation performed on the subsurface formation, the new coring data received during the new coring operation and including a plurality of new coring parameters; and
   (vii) determining, during the new coring operation, one or ore predicted characteristics of the subsurface formation based on the new coring data and the relationship between the coring data and the one or more properties of the subsurface formation derived in step (v); where
   the one or more predicted characterisitics of the subsurface formation is selected from a group consisting of mineralogy, cementation, porosity, permeability, and grain density.

11. The system of claim 10, wherein the coring data comprises data obtained from a motor used for performing the coring operation.

12. The system of claim 10, wherein the plurality of coring parameters comprise coring pressure, coring temperatures, revolutions per minute (RPM) of the coring operation, and rate of penetration (ROP) of the coring operation.

13. The system of claim 10, wherein the one or more properties of the subsurface formation comprise at least one of geological, petrophysical, and mechanical properties of the subsurface formation.

14. The system of claim 13, wherein the geological properties comprise at least one of mineralogy and cementation.

15. The system of claim 13, wherein the petrophysical properties comprise at least one of porosity, permeability, and grain density.

16. The system of claim 13, wherein the mechanical properties comprise at least one of Young's modulus, bulk modulus, Poisson's ratio, fracture gradient, and formation strength.

17. The system of claim 10, the coring operation comprises at least one of conventional coring and sidewall coring.

18. The system of claim 10, wherein the step of deriving a relationship between the coring data and the one or more properties of the subsurface formation includes determining a correlation between the coring data and the one or more properties of the subsurface formation.

* * * * *

UNITED STATES PATENT AND TRADEMARK OFFICE
CERTIFICATE OF CORRECTION

| | |
|---|---|
| PATENT NO. | : 11,579,333 B2 |
| APPLICATION NO. | : 16/812910 |
| DATED | : February 14, 2023 |
| INVENTOR(S) | : Anas Mohammedali Almarzooq et al. |

It is certified that error appears in the above-identified patent and that said Letters Patent is hereby corrected as shown below:

In the Claims

Column 10, Claim 10, Line 31 should read:
-- more predicted characteristics of the subsurface for- --

Column 10, Claim 10, Line 35 should read:
-- the one or more predicted characteristics of the subsur- --

Signed and Sealed this
Eighteenth Day of April, 2023

Katherine Kelly Vidal
*Director of the United States Patent and Trademark Office*